US010626984B2

(12) United States Patent
Stehle et al.

(10) Patent No.: US 10,626,984 B2
(45) Date of Patent: Apr. 21, 2020

(54) TRANSMISSION CONTROL SYSTEM

(71) Applicant: ZF Friedrichshafen AG, Friedrichshafen (DE)

(72) Inventors: Harald Stehle, Tettnang (DE); Günther Maier, Meckenbeuren (DE); Christian Villing, Friedrichshafen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 16/250,336

(22) Filed: Jan. 17, 2019

(65) Prior Publication Data
US 2019/0219160 A1 Jul. 18, 2019

(30) Foreign Application Priority Data
Jan. 18, 2018 (DE) .................. 10 2018 200 774

(51) Int. Cl.
*F16H 61/02* (2006.01)
*F16H 61/06* (2006.01)
*F16H 59/46* (2006.01)
*F16H 61/68* (2006.01)

(52) U.S. Cl.
CPC .......... *F16H 61/061* (2013.01); *F16H 59/46* (2013.01); *F16H 61/68* (2013.01); *F16H 2059/462* (2013.01)

(58) Field of Classification Search
CPC .......... F16H 59/46; F16H 61/02; F16H 61/04; F16H 61/10; F16H 61/061; F16H 61/68
See application file for complete search history.

(56) References Cited

U.S. PATENT DOCUMENTS

| 6,149,547 A | 11/2000 | Oba et al. |
| 8,868,307 B2 | 10/2014 | Jeon |
| 2007/0167284 A1 | 7/2007 | Steinhauser et al. |
| 2008/0220937 A1* | 9/2008 | Nozaki ................. B60K 6/365 |
| | | 477/86 |

(Continued)

FOREIGN PATENT DOCUMENTS

| DE | 19917575 A1 | 10/2000 |
| DE | 102006002122 A1 | 7/2007 |

(Continued)

OTHER PUBLICATIONS

German Search Report DE102018200776.4 dated Oct. 4, 2018. (10 pages).

(Continued)

*Primary Examiner* — Edwin A Young
(74) *Attorney, Agent, or Firm* — Dority & Manning, P.A.

(57) ABSTRACT

A gearbox (100) includes an input shaft (105), which is connected to a drive source, and a first and a second proportionally controllable shift element (A-F). A method (200) for open-loop control of the gearbox (100) includes: determining (210) an absolute torque demand (330) on the drive source on the basis of a profile controlled by way of an open-loop system (340) and a profile controlled by way of a closed-loop system (345); determining (220) whether the absolute torque demand (330) threatens to exceed a predetermined threshold value (335); and, in response, reducing (225) the portion controlled by way of the closed-loop system (345).

7 Claims, 3 Drawing Sheets

(56) References Cited

U.S. PATENT DOCUMENTS

2011/0184612 A1* 7/2011 Fujii .................... F16H 61/061
   701/54
2016/0185352 A1* 6/2016 Burow ................. B60W 20/10
   701/22
2017/0335926 A1* 11/2017 Schiele ................ F16H 61/061

FOREIGN PATENT DOCUMENTS

DE      102011055926 A1    12/2012
DE      102012222366 A1    6/2014

OTHER PUBLICATIONS

German Search Report DE102018200777.2 dated Sep. 18, 2018. (10 pages).
German Search Report DE102018200779.9 dated Sep. 5, 2018. (10 pages).

* cited by examiner

TRANSMISSION CONTROL SYSTEM

FIELD OF THE INVENTION

The present invention relates generally to a transmission control. In particular, the present invention relates to the open-loop control of a gearbox for use in a motor vehicle.

BACKGROUND

A motor vehicle includes a drive train which includes a prime mover or drive source, a gearbox, and a driving wheel. Different gear steps or ratios may be engaged in the gearbox in order to adapt a rotational speed of the prime mover to a rotational speed of the driving wheel. The gearbox includes multiple gear sets which may be differently configured and combined with the aid of shift elements. A control device controls the shift elements by way of an open-loop system and, in this way, determines which gear ratio is engaged, i.e., which step-down ratio (or step-up ratio) is present between an input side and an output side of the transmission, and determines with the aid of which gear sets in which configuration the step-down ratio is achieved. During a changeover from one gear ratio into another gear ratio, usually at least one shift element is disengaged and another shift element is engaged in order to achieve a changeover which is as smooth as possible.

In order to assist the gear step changeover, a torque introduced by a prime mover into the gearbox may be confined to a predetermined value with the aid of a demand. The range in which such a restriction is effective is limited, however, and so the open-loop control of the gearbox, for example, to a synchronization point of a gear step to be engaged with the aid of a specification of the introduced torque, may be difficult.

One problem addressed by the invention is that of providing an improved technique for the changeover of a gear step engaged in a gearbox.

SUMMARY OF THE INVENTION

A gearbox includes an input shaft, which is connected to a drive source/prime mover, and a first and a second proportionally controllable shift element. A method for the open-loop control of the gearbox includes determining an absolute torque demand on the prime mover on the basis of a profile controlled by way of an open-loop system and a profile controlled by way of a closed-loop system; determining whether the absolute torque demand threatens to exceed a predetermined threshold value; and, when this is the case, reducing the portion controlled by way of a closed-loop system.

The method may be carried out in conjunction with a gear ratio changeover, wherein the gear ratio changeover may include the disengagement of the first shift element, in order to disengage an old gear ratio, and the engagement of the second shift element, in order to engage a new gear ratio. The reduction preferably takes place only to the extent that the threshold value is not exceeded. As a result, it may be ensured that a torque demand which the prime mover cannot meet is not output. An effect which is known in another context as "wind up" may be prevented in this way. The engagement of a gear ratio by engaging the second shift element may be carried out smoothly. This may also apply when the second shift element is form-fit and cannot transmit torque in the manner of a friction clutch having variable slip.

The threshold value may be determined with the aid of a characteristic map. Input parameters for the characteristic map may include, for example, a rotational speed of the input shaft and/or a prevailing air pressure. Due to the local determination, a meaningful threshold value may be self-sufficiently predefined and an external source may then be dispensed with.

The threshold value may also be made available by the prime mover. Additional parameters or conditions which cannot be present on the gearbox may be evaluated in this case. The threshold value made available by the prime mover may therefore be more realistic. On the other hand, the provision of the threshold value by the prime mover may be occasionally delayed. In this case and in other cases, the locally determined threshold value may be utilized. A changeover between the described sources for the threshold value may take place with practically any frequency. In one further embodiment, the threshold values from both sources may even be fused with one another, for example, in that a minimum value, a maximum value, or an arithmetic or weighted mean is determined.

The reduction may be activated and deactivated with the aid of a hysteresis. In particular, the reduction may be activated when a difference between the demanded torque and the threshold value falls below a first predetermined threshold value, and may be deactivated when the difference exceeds a second predetermined threshold value. In this case, the second threshold value is greater than the first threshold value.

The hysteresis may prevent an all too frequent changeover between a confined operation and an unconfined operation of the underlying synchronization control. In particular, when the utilized threshold value is digitally quantized with a low resolution, i.e., smallest representable differences between values of the threshold value have considerable magnitudes, the utilization of the hysteresis may stabilize the response behavior of the synchronization. This generally applies, in particular, in connection with the above-described variant, in which the prime mover specifies the threshold value.

In one further embodiment, the second shift element may also be engaged when the input shaft has reached a predetermined rotational speed. Each shift element is usually associated with a gear set which implements a gear ratio in the gearbox. Due to the engagement, the engagement of a gear ratio synchronized with the rotational speed of the input shaft may be carried out. Optionally, the method may also include a disengagement of the first shift element.

A device for the open-loop control of the above-described gearbox includes an interface for connection to the prime mover and the processing unit which is configured for determining an absolute torque demand on the prime mover on the basis of a profile controlled by way of an open-loop system and a profile controlled by way of a closed-loop system; determining whether the absolute torque demand threatens to exceed a predetermined threshold value; and, when this is the case, reducing the portion controlled by way of a closed-loop system.

The interface may include, in particular, a CAN bus. The control device for the gearbox is also referred to as a TCU (transmission control unit). A control device for the prime mover, which is connected to the interface or the CAN bus, is also referred to as an ECU (engine control unit).

The device may be utilized for carrying out the method described herein. Advantages or features of the method may be transferred to the device, and vice versa.

The device may also include an actuator for engaging the second shift element when the input shaft has reached a predetermined rotational speed. The actuator may implement an, in particular, hydraulic actuation of the shift element. Usually, the actuator may be proportionally controlled by way of an open-loop system when the shift element is configured for proportionally transmitting a torque, for example, when the shift element operates in the manner of a friction clutch. If the shift element transmits torque only in a binary manner, i.e., either completely or not at all, for example, when the shift element is designed in the manner of a dog clutch, the actuator may also be designed in a binary manner and not assist any interstages. The actuator is usually electrically actuated and the processing unit usually includes a programmable microcomputer or microcontroller which make an electric control signal available for the actuator.

BRIEF DESCRIPTION OF THE DRAWINGS

The invention will now be described more precisely with reference to the attached figures, in which.

DETAILED DESCRIPTION

Figure 1:
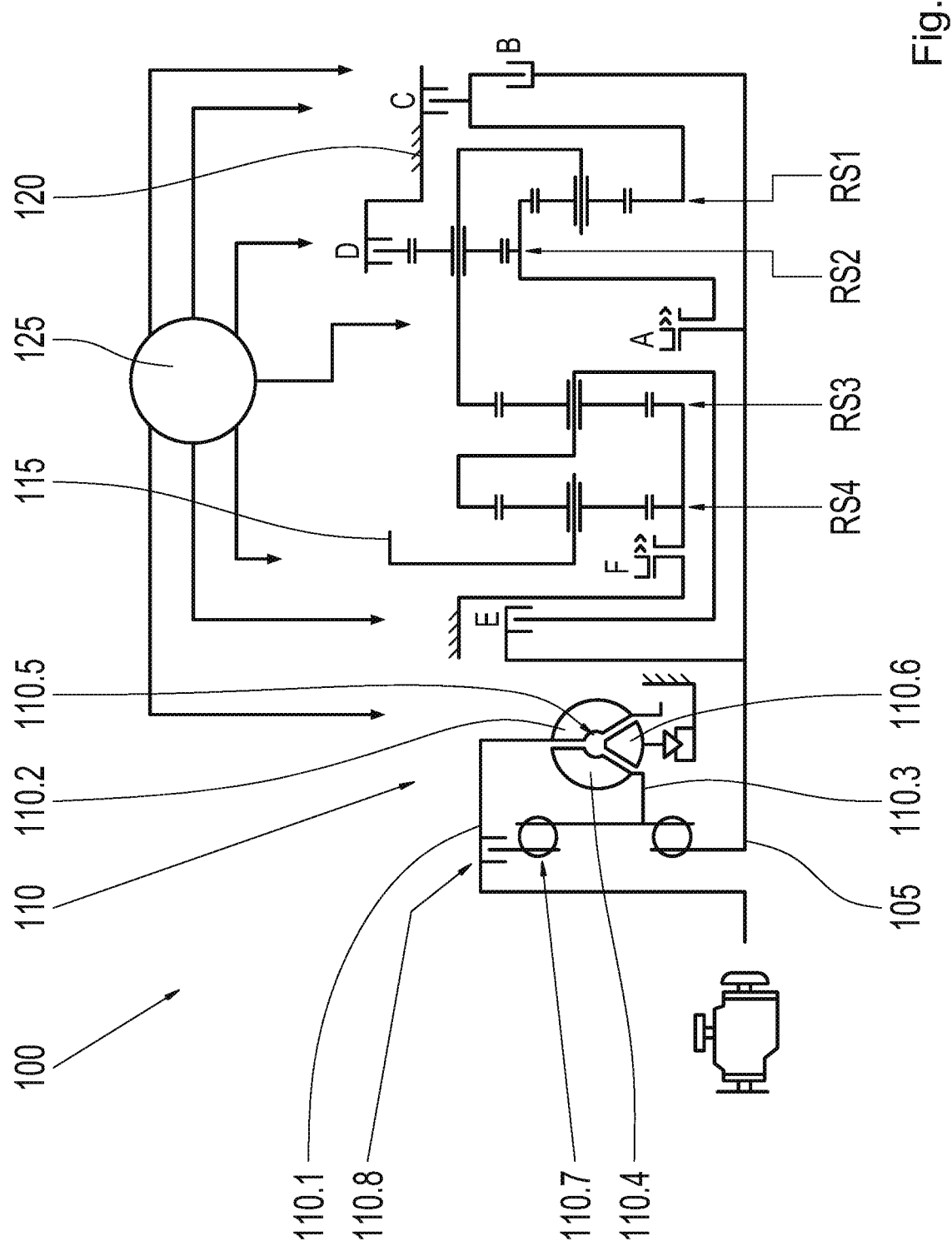
FIG. 1 shows a gearbox, for example, for use in a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of an exemplary gearbox 100 which is designed as a multi-stage planetary transmission. A changeover of a gear step or ratio engaged in the gearbox 100 is preferably hydraulically controllable. The present invention is described with reference to the represented gearbox 100, although the present invention may also be utilized on other types of transmissions which permit a controlled engagement or disengagement of a gear step.

The gearbox 100 is designed, by way of example, as a 9-speed transmission including one reverse gear and may preferably be utilized in a motor vehicle. The gearbox 100 includes four gear sets RS1 through RS4, each of which may be implemented as an epicyclic system, in particular, in the form of planetary gear trains. An input shaft 105 is configured for connection to a prime mover or drive source. Optionally, a hydrodynamic torque converter 110 is provided between the prime mover and the input shaft 105. The torque converter 110 may be designed to be integral with the gearbox 100 or may be encompassed by the gearbox 100. An output shaft 115 of the gearbox 100 is preferably configured for connection to a driving wheel of the motor vehicle in a torque-transmitting manner.

The hydrodynamic torque converter 110 includes an input side 110.1 which drives a pump 110.2, and an output side 110.3 which is driven by a turbine 110.4. The coupling takes place with the aid of a fluid 110.5 which flows between the pump 110.2 and the turbine 110.4. Preferably, a stator 110.6 is provided in order to direct and, if necessary, control the fluid flow. The torque converter 110 is provided, in particular, as a launch clutch and may bring about an increase in torque depending on a slip between the input side 110.1 and the output side 110.3. A vibration damper 110.7 may be connected to the output side 110.3 in order to reduce torsional vibrations in the torque path. The vibration damper 110.7 may also be provided when the torque converter 110 is dispensed with. Usually, a torque converter lockup clutch 110.8 is provided in order to set the rotational speed difference between the input side 110.1 and the output side 110.3 to zero and, in this way, to minimize flow losses in the torque converter 110, in particular at higher rotational speeds, i.e., after a starting operation.

The gear sets RS1 through RS4 are interconnected in the manner shown, by way of example. Each gear set includes three elements which engage into one another with the aid of tooth systems. The radially innermost element is also referred to as the sun gear, the outermost element is referred to as the ring gear, and the element located therebetween is also referred to as the planet gear. The planet gear is mounted so as to be rotatable with respect to a planet gear carrier which, for its part, is mounted so as to be rotatable about the same axis of rotation as the sun gear and the ring gear. In the representation from FIG. 1, the axis of rotation (not represented) extends horizontally along the input shaft 105. Parts of the gear sets RS1 through RS4 located axially symmetrically below the axis of rotation, as well as their shafts, are not represented. If one of the elements sun gear, planet gear carrier, or ring gear is held, in particular, by way of being braked with respect to a transmission housing 120, the other two elements may be utilized for coupling and decoupling torque, wherein a predetermined step-up or step-down ratio is achieved.

For the open-loop control of a torque flow through the gear sets RS1 through RS4, a total of six shift elements A through F are available in the represented embodiment, each of which may be activated to be disengaged or engaged. The shift elements C and D each operate between a rotary element and the transmission housing 120 and are also referred to as brakes. The shift elements A, B, E and F each operate between two rotary elements and are also referred to as clutches. At least one of the shift elements A through F is preferably configured for being capable of disconnecting or connecting, in a proportionally controllable manner, a torque connection between a completely disengaged position and a completely engaged position. For this purpose, friction elements may be provided, which are pressed axially against one another in order to establish a variable frictional connection. An axial contact force may be brought about, in particular, hydraulically, for the purpose of which, for example, an electronic pressure regulator may adjust a hydraulic control pressure according to a control signal in order to control the level of the torque transmission.

In the present embodiment, at least the shift elements B through E are proportionally controllable in terms of their transmission behavior. The shift elements A and F, in particular, may be designed as form-fit shift elements which may only be completely disengaged or completely engaged. The following table shows an exemplary shift pattern. For each gear step, shift elements A through F which are engaged in order to engage the gear step are marked with a dot. The other shift elements A through F are disengaged.

| Gear step | C | D | B | E | F | A |
| --- | --- | --- | --- | --- | --- | --- |
| 1 |   |   |   | • | • | • |
| 2 | • |   |   |   | • | • |
| 3 |   |   | • | • | • |   |
| 4 |   | • |   | • | • |   |
| 5 |   |   | • | • | • |   |
| 6 | • |   | • | • |   |   |
| 7 |   | • | • | • |   |   |
| 8 | • | • | • |   |   |   |
| 9 |   | • | • | • |   |   |
| R |   | • | • |   | • |   |

A changeover from an engaged gear step to another gear step requires the disengagement of at least one engaged shift element A through F and the engagement of at least one disengaged shift element A through F.

If, for example, the second gear step is engaged in the gearbox, torque is transmitted from the input shaft 105 via the shift element A to the ring gear of the first gear set RS1. The sun gear of the first gear set RS1 is connected to the housing 120 via the shift element C. The shift element D is disengaged, and so the second gear set RS2 transmits no torque. The torque made available by the first gear set RS1 at the planet gear carrier of the first gear set RS1 is transmitted to the ring gear of the third gear set RS3. Sun gears of the third gear set RS3 and of the fourth gear set RS4 are connected to the housing 120 via the shift element F. Torque is coupled from the planet gear carrier of the third gear set RS3 into the ring gear of the fourth gear set RS4. The output shaft 115 is driven by the planet gear carrier of the fourth gear set RS4.

In order to now engage the third gear step, the shift element B is engaged and the shift element A is disengaged. The functions of the gear sets RS2 through RS4 remain unchanged. As in the second gear step, the first gear set RS1 is driven via the ring gear and torque is made available via the planet gear carrier. The sun gear is now connected via the shift elements A and B to the ring gear, however, and so the step-down ratio of the first gear set RS1 is set to one.

In order to ensure a high level of shifting comfort or a high shifting speed, the condition changes at the shift elements A through F must be more precisely matched to one another. During a gear step changeover, two gear steps are usually intermittently simultaneously engaged and transmit torque, wherein at least one of the shift elements A through F is in the slip condition.

A control device 125 is configured for appropriately disengaging and engaging the shift elements A through F and, in this way, engaging a desired gear step in the gearbox 100. The shift elements A through F are usually hydraulically actuated, wherein a disengagement or engagement force and a disengagement or engagement position of a shift element A through F depend on an applied hydraulic pressure. An electronic pressure regulator is usually assigned to each shift element A through F for the open-loop control of the hydraulic pressure. A pressure regulator converts a predefined, usually electrical signal into a corresponding hydraulic pressure and may operate in the manner of a proportional valve, a control valve, or servo-valve. The control device 125 operates preferably electrically and may include a programmable microcomputer or microcontroller. A signal made available at an electronic pressure regulator may be present as a pulse-width modulated (PWM) signal.

The control device 125 determines control signals to be set for the shift elements A through F usually with respect to an event, the time, or a transmission parameter which may be sampled with the aid of a suitable sensor. Transmission parameters may include, for example, rotational speeds at different points of the gearbox 100, a hydraulic pressure, a torque to be made available or to be transmitted, a temperature, or a position of a shift element A through F. An event may be derived from one sampled parameter or from a combination of multiple sampled parameters. For example, it may be determined that a synchronization point is no longer met when a slip sets in at a shift element A through F and the friction elements have different rotational speeds. The fact that the synchronization point is no longer met may also be determined on the basis of a ratio of rotational speeds of the input shaft 105 with respect to the output shaft 110. If the ratio does not match a predetermined reduction ratio of a gear step, the synchronization point of this gear step is not met. An event may also be determined with reference to an external parameter, for example, when a signal regarding a changed driver demand, a changed operation of the prime mover, or a change in the drive train between the output shaft 115 and a driving wheel is acquired.

The processing unit 125 may predefine the hydraulic control pressure to be set for a shift element A through F in the form of a curve over time, which is also referred to as a control profile or gradient. For a predetermined sequence in the gearbox 100, for example, the changeover from the third gear step into the second gear step, multiple profiles, which are matched to each other, for the shift elements A through F are usually determined and made available. A changeover of the gear step may require a time of approximately a quarter (¼) second or less. Under certain circumstances, however, a changeover of the gear step may be extended for a longer time. A control profile may be composed of multiple portions which may be additively combined with one another. A portion may be static, in part or completely, when the control profile is dependent only on time and not on an event or a parameter. A portion may also be dynamic when there is a dependency on an event or a parameter. In this case, the control profile may be determined or changed while the control profile is already being utilized for the open-loop control of a shift element A through F. For example, a first portion may ensure the desired functionality in the first approximation, a second portion may represent a refinement, such as an increase in comfort, and a third portion may implement a further optimization in a special case, for example, during downshifting accompanied by a brake application at a driving wheel.

In order to assist the changeover of the engaged gear step, a request to limit the torque provided by the prime mover to a predetermined value may also be transmitted to the prime mover connected to the input shaft 105.

Figure 2:
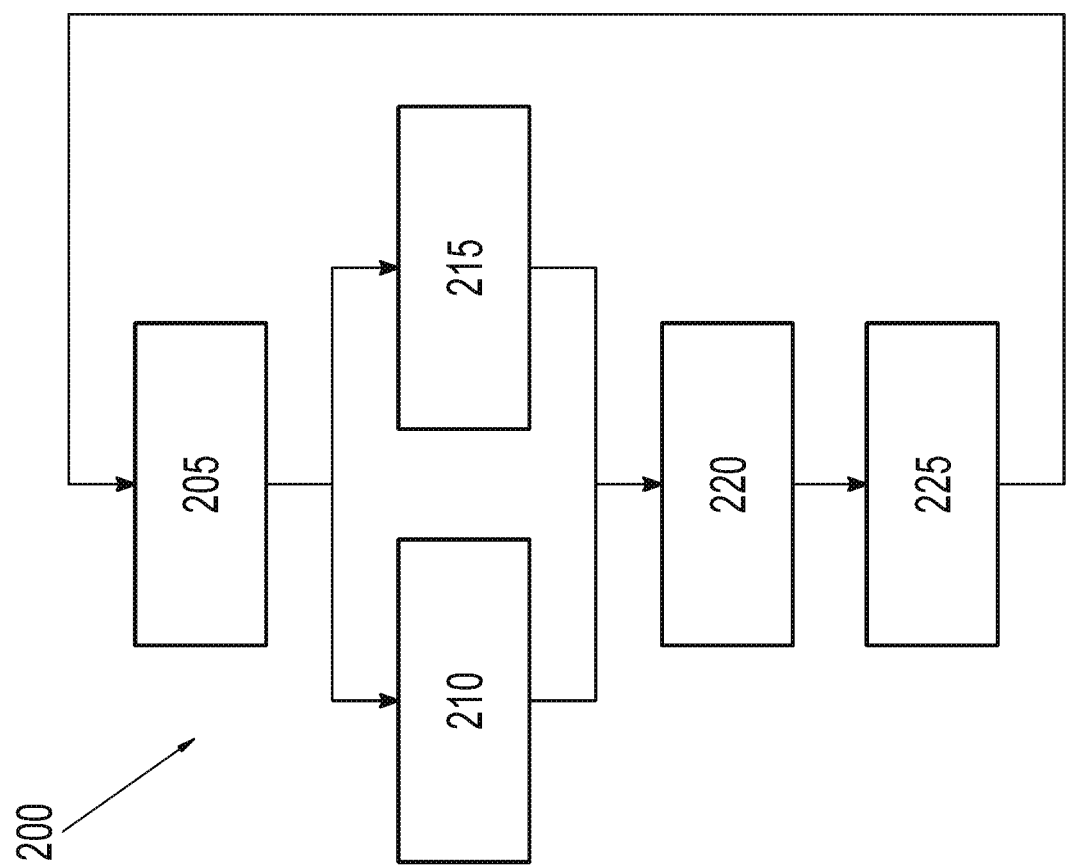
FIG. 2 shows a flow chart of a method for the open-loop control of a gearbox.

FIG. 2 shows a flow chart of a method 200 for the open-loop control of a gearbox 100. The method 200 may be utilized, in particular, in connection with a higher-order or interlaced method for the changeover of a gear step engaged in the gearbox 100. In particular, it is preferred that the gear step changeover includes an engagement of a shift element A through F which is designed to be form-fit, in particular, is designed as a dog clutch.

The method 200 begins at 205. At step 210, a determination is made regarding the absolute amount by which a torque made available by the prime mover connected to the input shaft 105 must be increased in order to carry out the gear step changeover. For this purpose, usually two values or two time sequences are determined, which are added. A first profile is controlled by way of an open-loop system, i.e., a first profile is determined one time and is not changed during the gear step changeover. In the case of a downshift with engagement of a dog clutch A or F, the way in which the rotational speed of the input shaft 105 must be influenced in order to be able to reach a synchronization point and engage the dog clutch may be, for example, fixedly predefined or determined one time. A second profile is controlled by way of a closed-loop system and is dynamically determined as a function of a present parameter or a condition at the gearbox 100. The sum of the two profiles yields a relative demand for an engine torque, wherein the relative demand is based on a transmitted torque of zero Nm. On the basis of a presently provided torque, an absolute demand is determined from the relative demand and, preferably, is also immediately output to the prime mover.

At 215 which is independent thereof, a maximally controllable engine override may be determined. The engine override relates to an absolute threshold value which may be expressed, for example, in Nm. In a first variant, this threshold value is made available by the prime mover periodically or upon demand. Dynamic parameters such as an engine temperature or a prevailing air pressure may be taken into account in this case. In a second variant, the threshold value is determined by way of the open-loop control of the gearbox 100. For this purpose, in particular, a characteristic map may be predefined, which provides the sought value, for example, with respect to a rotational speed of the input shaft 105 and/or a prevailing air pressure. Further parameters such as a transmission temperature may also be incorporated into the determination. The source of the threshold value may be dynamically selected, and so, for example, a value made available by the prime mover is preferably utilized. If the value is not available or if there is doubt regarding the correctness or accuracy of the value which was made available, the internally determined value is utilized, however. Moreover, optionally, the greater or lesser of the two values may be utilized.

At 220, it is determined whether the determined absolute demand value threatens to exceed the threshold value. If this is not the case, a usual open-loop control of the synchronization of the gearbox 100 during the present gear change operation may continue to take place, unchanged. On the other hand, if the absolute demand value is about to exceed the threshold value or if this is of concern or has already taken place, the synchronization control may be adapted at 225, in order to prevent the absolute demand value from being exceeded. Since the above-described portion controlled by way of an open-loop system cannot be changed without risking a faulty synchronization during the engagement of the shift element A or F, the portion controlled by way of a closed-loop system is preferably reduced at least to the extent that the absolute demand value being exceeded is prevented. Preferably, the portion controlled by way of a closed-loop system is reduced to such an extent that the absolute demand value being exceeded is only barely prevented, and so the absolute demand remains under the determined threshold value by a predetermined, in particular, small amount.

The method 200 is preferably cyclically executed. The output of the determined engine demand may therefore alternatively take place before or after the adaptation of the portion controlled by way of a closed-loop system. It is preferred that a hysteresis is provided, in particular, when the source of the threshold value at 215 is the prime mover, in order to ensure that the activation and deactivation of the reduction of the portion controlled by way of a closed-loop system do not become too frequent. For example, the reduction may be activated when the absolute demand is below the threshold value by less than four (4) Nm and may be deactivated when the absolute demand is subsequently below the threshold value by more than twenty (20) Nm.

Figure 3:
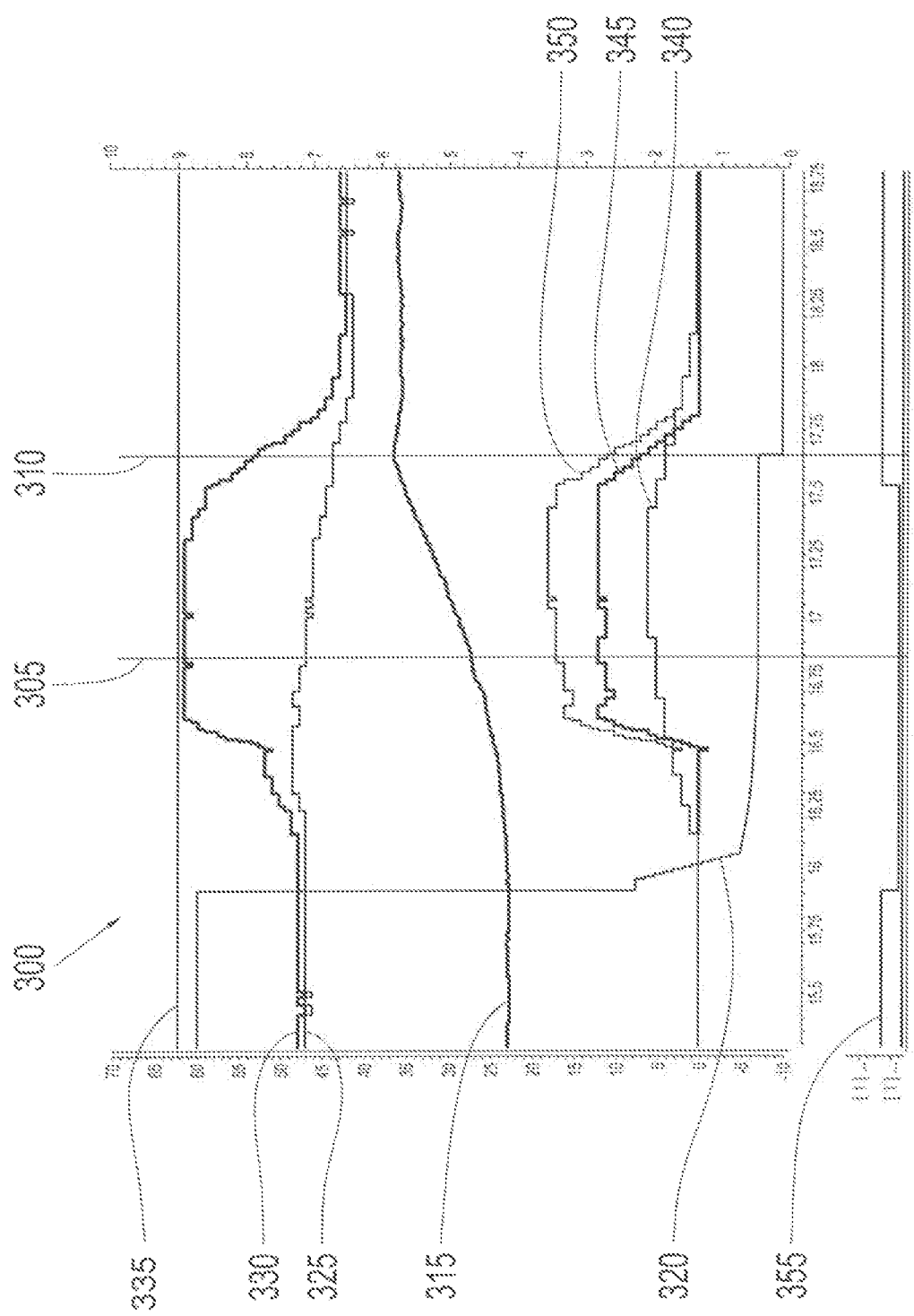
FIG. 3 shows exemplary profiles with respect to a gearbox during a changeover of an engaged gear step.

FIG. 3 shows exemplary profiles 300 of parameters of a gearbox 100. Profiles over time are graphically represented in a range on the left. Absolute values of variables of the gearbox 100 at a first point in time 305 and at a second point in time 310 are expressed numerically in a range on the right. The represented values were determined on a real, exemplary gearbox 100 during a downshift, which was also exemplary, from a higher gear step into a lower gear step. In this case, a shift element A through F to be engaged is designed to be form-fit, in particular, is designed as a dog clutch.

Profiles which are plotted are an actual rotational speed 315 of the input shaft 105, a specified pressure profile 320 of a disengaging shift element A through F (PKAB), a torque 325 $m\_t$ present at the input shaft 105, an absolute transmission-engine override demand 330 me_red_abs, a maximum engine torque 335 KF_MEGLSNMOTPAIR which may be set on the basis of a characteristic map, a portion controlled by way of an open-loop system 340 me_sas_int of the engine override demand, a portion controlled by way of a closed-loop system 345 me_gls of the engine override demand, and a relative demand 350 me_sas, which is determined as the sum of portions 340 and 345.

After or upon the disengagement of the shift element A through F according to the profile 320, the rotational speed of the input shaft 105 must be increased by accelerating the prime mover in order to allow for the engagement of the dog clutch A or F associated with the gear step to be engaged. The profile controlled by way of an open-loop system 340 is predetermined therefor and increases the rotational speed of the input shaft 105 to an extent which is sufficient for engaging the dog clutch A or F. The profile controlled by way of a closed-loop system 345 is determined on the basis of present parameters, for example, a temperature-dependent viscosity of a transmission fluid, and dynamically adjusts the profile of the engine demand. The sum of the profiles 340 and 345 is given in the profile 350 once again, which expresses the relative demand on the prime mover based on a torque of zero.

On the basis of the torque 325 made available by the prime mover, the absolute demand of the profile 330 is determined therefrom, for example, via multiplication. The prime mover receives only this value for the open-loop control of the torque which the prime mover makes available. The demand 330 threatens to exceed the selected threshold value 335 even before the first point in time 305. In the represented example, the threshold value 335 is determined by the gearbox or the control device 125, for example, on the basis of a characteristic map, in particular, on the basis of a rotational speed of the input shaft 105 and/or a prevailing air pressure. In another variant, the threshold value may even be statically or dynamically predefined by the prime mover (m_reserve). In order to ensure that the absolute demand value is not exceeded, the portion controlled by way of a closed-loop system 340 is confined, as is apparent on the basis of its flat profile up to shortly before the second point in time 310. The profile 350 of the relative demand and the profile 330 of the absolute demand reflect this restriction.

An exemplary time-dependent condition 355 is plotted in a lower area of FIG. 3. The condition 355 assumes a high potential when the input shaft 105 has assumed a predetermined synchronous speed. Otherwise, the condition 355 assumes a low potential.

Modifications and variations can be made to the embodiments illustrated or described herein without departing from the scope and spirit of the invention as set forth in the appended claims.

REFERENCE CHARACTERS 100 gearbox
105 input shaft
110 hydrodynamic torque converter
110.1 input side
110.2 pump
110.3 output side
110.4 turbine
110.5 fluid
110.6 stator
110.7 vibration damper
110.8 torque converter lockup clutch
115 output shaft
120 transmission housing
A-F shift element
200 method
205 start
210 determine the demanded engine override
215 determine the maximum engine override
220 Threat that the demand cannot be met?
225 reduce the portion controlled by way of a closed-loop system of the demanded engine override
300 profiles
305 first point in time
310 second point in time
315 actual rotational speed of input shaft
320 specified pressure of disengaging shift element (PKAB)
325 torque made available by prime mover
330 absolute engine demand
335 maximum engine torque which can be made available
340 portion of the engine override demand controlled by way of an open-loop system
345 portion of the engine override demand controlled by way of a closed-loop system
350 relative engine override demand

The invention claimed is:

1. A method (200) for open-loop control of a gearbox (100) that includes an input shaft (105) connected to a drive source, a first proportionally controllable shift element (A-F) and a second proportionally controllable shift element (A-F), the method (200) comprising:
determining (210) an absolute torque demand (330) on the drive source on the basis of a profile controlled by way of an open-loop system (340) and a profile controlled by way of a closed-loop system (345);
determining (220) whether the absolute torque demand (330) threatens to exceed a predetermined threshold value (335); and
when the absolute torque demand (330) threatens to exceed the predetermined threshold value (335), reducing (225) the portion of the absolute torque demand (330) controlled by way of the closed-loop system (345).

2. The method (200) of claim 1, wherein the threshold value (335) is determined with a characteristic map.

3. The method (200) of claim 1, wherein the threshold value (335) is determined by the drive source.

4. The method (200) of claim 1, wherein the reducing (225) starts when a difference between the absolute torque demand (330) and the predetermined threshold value (335) falls below a first predetermined threshold value, and the reducing (225) terminates when the difference exceeds a second predetermined threshold value, the second threshold value being greater than the first threshold value.

5. The method (200) of claim 1, further comprising engaging the second shift element (A-F) when the input shaft (105) reaches a predetermined rotational speed.

6. A device (125) for open-loop control of a gearbox (100) that includes an input shaft (105) connected to a drive source, a first proportionally controllable shift element (A-F) and a second proportionally controllable shift element (A-F), the device (125) comprising:
an interface for connection to the drive source;
a processing unit (125); and
a memory storing computer-executable instructions that, when executed by the processing unit (125), cause the processing unit (125) to perform operations comprising
determining an absolute torque demand (330) on the drive source on the basis of a profile controlled by way of an open-loop system (340) and a profile controlled by way of a closed-loop system (345),
determining whether the absolute torque demand (330) threatens to exceed a predetermined threshold value (335), and
when the absolute torque demand (330) threatens to exceed the predetermined threshold value (335), reducing the portion of the absolute torque demand (330) controlled by way of the closed-loop system (345).

7. The device (125) of claim 6, further comprising an actuator for engaging the second shift element (A-F) when the input shaft (105) reaches a predetermined rotational speed.

* * * * *